(12) United States Patent
Oeuvrard et al.

(10) Patent No.: US 8,777,466 B2
(45) Date of Patent: Jul. 15, 2014

(54) AUTOMOBILE ORNAMENT PANEL INCLUDING AN ICON AND A LIGHT-TRANSMITTING MATERIAL

(75) Inventors: Jean-Francois Oeuvrard, Cergy Pontoise (FR); Godefroy Beau, La Garenne Colombes (FR)

(73) Assignee: Faurecia Interieur Industrie, Nanterre (FR)

( * ) Notice: Subject to any disclaimer, the term of this patent is extended or adjusted under 35 U.S.C. 154(b) by 601 days.

(21) Appl. No.: 13/060,625

(22) PCT Filed: Aug. 6, 2009

(86) PCT No.: PCT/FR2009/051564
§ 371 (c)(1),
(2), (4) Date: Feb. 24, 2011

(87) PCT Pub. No.: WO2010/023391
PCT Pub. Date: Mar. 4, 2010

(65) Prior Publication Data
US 2011/0157906 A1    Jun. 30, 2011

(30) Foreign Application Priority Data
Aug. 29, 2008    (FR) ...................................... 08 55818

(51) Int. Cl.
*B60Q 1/00*    (2006.01)
(52) U.S. Cl.
USPC ........... 362/488; 362/489; 362/490; 362/491; 362/492; 362/201; 362/511

(58) Field of Classification Search
USPC .................................................. 362/459–549
See application file for complete search history.

(56) References Cited

U.S. PATENT DOCUMENTS

| | | | |
|---|---|---|---|
| 2004/0017687 A1* | 1/2004 | Misaras | 362/489 |
| 2006/0066192 A1* | 3/2006 | Beeson et al. | 313/112 |

FOREIGN PATENT DOCUMENTS

| | | |
|---|---|---|
| FR | 2824510 A1 | 11/2002 |
| FR | 2872953 A1 | 1/2006 |
| FR | 2877896 A1 | 5/2006 |
| FR | 2911555 A1 | 7/2008 |
| JP | 2001/191845 A | 7/2001 |

OTHER PUBLICATIONS

International Search Report, dated Nov. 23, 2009, from corresponding PCT application.

* cited by examiner

*Primary Examiner* — William Carter
(74) *Attorney, Agent, or Firm* — Young & Thompson

(57) ABSTRACT

A panel includes at least one icon area (8), the area (8) being illuminated by a light source (10) placed under the ornament panel, the ornament panel (1) including a translucent skin (2) forming the outer surface (6) of the ornament panel and a substrate layer (4) placed against the skin (2), the substrate layer (4) including an opening (14) placed at least between the light source (10) and the icon area (8). A light-transmitting material (18) is placed in at least part of the opening (14), the material (18) being placed in a translucent substrate element (20) placed in the opening (14) between the material (18) and the light source (10).

19 Claims, 1 Drawing Sheet

AUTOMOBILE ORNAMENT PANEL INCLUDING AN ICON AND A LIGHT-TRANSMITTING MATERIAL

The present invention relates to an automobile trim panel, of the type comprising at least one pictogram area, said area being illuminated by a light source arranged under the trim panel, the trim panel including a translucent skin forming the outer surface of the trim panel and a substrate layer arranged against the skin, said substrate layer including an opening arranged at least between the light source and the pictogram area.

The invention also relates to a method for making such a trim panel, as well as an automobile comprising such a panel.

BACKGROUND OF THE INVENTION

It is known to provide trim panels of the aforementioned type making it possible to display pictograms directly on the skin of the panels, said pictograms indicating certain functions or certain states of the vehicle. "Pictogram" refers to any figurative or symbolic drawing used for communication purposes, including alphanumeric signs.

In such trim panels, the pictogram being backlit, the light passes through the substrate layer of the panel and reaches the translucent skin from underneath.

The smallest flaw in the substrate layer on the path of the light degrades the quality of the lit pictogram, due to the diffusion of the light by that flaw in the substrate layer around the area forming the pictogram. The pictogram becomes blurry and the display is degraded. Such flaws for example include the presence of air bubbles or dust in the light's path.

SUMMARY OF THE INVENTION

The invention aims to offset these drawbacks by proposing a trim panel and a method for making that panel making it possible to avoid the presence of bubbles and dust in the light's path in order to obtain a backlit pictogram clearly and with a better display quality.

To that end, the invention relates to a trim panel of the aforementioned type, in which a light-transmitting material is arranged in at least part of said opening, said material being arranged in a translucent substrate member arranged in the opening between said material and said light source.

The presence of a substrate member under the light-transmitting material makes it possible to avoid the deposition of dust or formation of bubbles between the light source and the pictogram area, in particular on or in the transmitting material while the trim panel is made. Thus, a trim panel is obtained in which the path of the light is not disrupted by flows in the substrate layer, which enables a particularly clear display of the pictogram.

According to other features of the trim panel:
the substrate member is bowl shaped;
the substrate member is made from a smooth transparent material;
the light-transmitting material is a transparent polyurethane or silicon gel; and
the light-transmitting material completely fills the opening between the substrate member and the translucent skin, said skin being applied directly on said material.

The invention also relates to a method for making a trim panel as described above, the method comprising the following steps:

making a substrate member/light-transmitting material assembly by pouring said material in said substrate member,
arranging said assembly against the translucent skin opposite the pictogram area,
making the substrate layer around said assembly.

According to other features of the method:
the step for making the substrate member/light-transmitting material assembly comprises a step of depositing a film on the surface of the transmitting material intended to be in contact with the translucent skin, said film protecting said material and being removed before arranging the assembly against the translucent skin;
the step for making the substrate member/transmitting material assembly comprises a step of arranging a protective member against the face of the substrate member intended to be positioned opposite the light source; and
the step for making the substrate layer comprises a foaming step on the skin around the substrate member/transmitting member assembly, the foam then being pierced opposite the assembly up to the protective member, the protective member then being removed so as to obtain the trim panel.

The invention also relates to a motor vehicle comprising a trim panel as described above, in which said panel is applied against at least one portion of the cab of the vehicle.

BRIEF DESCRIPTION OF THE DRAWINGS

Other aspects and advantages of the invention will appear upon reading the following description, provided as an example and done in reference to the appended drawings, in which.

DETAILED DESCRIPTION OF THE PREFERRED EMBODIMENTS

In the description, "outer" refers to what is visible from the cab of the motor vehicle, and "inner" refers to what is not visible. The terms "upper" and "lower" are defined relative to a direction starting from the wall of the cab and going towards the inside of the cab.

Figure 1:
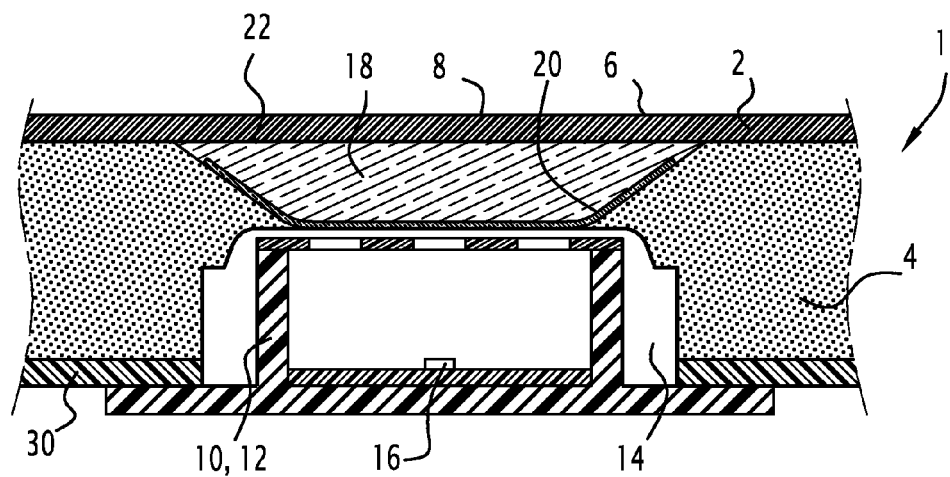
FIG. 1 is a diagrammatic cross-sectional illustration of a trim panel according to the invention.

In reference to FIG. 1, a trim panel 1 is described that comprises a translucent flexible skin 2, i.e. allowing light to pass, and a substrate layer 4 under and against the translucent skin 2. The skin 2 forms the outer face 6, visible from the cab of the motor vehicle, of the panel 1. The substrate layer 4 is for example made from foam in order to impart a flexible feel to the trim panel 1. This assembly can be configured in the desired manner to adapt to the trim of a motor vehicle. The outer surface 6 formed by the skin 2 is for example substantially planar or has protruding or hollow areas, for example to indicate the presence of control buttons for functions of the vehicle under the skin 2/substrate layer 4 assembly.

The trim panel 1 comprises at least one pictogram area 8 making it possible to display backlit information on the outer face 6 of the translucent skin 2. To that end, a light source 10 is arranged under the translucent skin 2 opposite the pictogram area 8. Said light source 10 is for example a lamp house 12 arranged in an opening 14 of the substrate layer 4. The opening passes through the substrate layer 4 opposite the pictogram area 8. The lamp house 12 is known in itself and for example comprises a light-emitting diode 16 arranged to emit light towards the pictogram area 8.

Above the lamp house 12, the opening 14 is filled with a light-transmitting material 18, such as a transparent polyurethane or silicone gel. A gel does not modify the light that passes through it, i.e. it does not divert the light coming from the light source 10. Moreover, such a gel does not have air bubbles, unlike the foam of the substrate layer 4, which prevents diffusion of the light inside the substrate layer 4 outside the path of the light between the light source 10 and the pictogram area 8.

The gel 18 is arranged in a bowl-shaped substrate member 20. The gel 18 is poured in said member 20 and due to the nature of the gel that fills the bowl, there is no bubble formation or dust deposition between the gel 18 and the substrate member 20. The substrate member 20 is for example made from a smooth transparent plastic material so as to prevent modification of the path of the light when it reaches and passes through the substrate member 20. To that end, the substrate member 20 is for example polished in order to obtain the best possible light transmission. As shown in FIG. 1, the substrate member 20 is inserted between the light source 10 and the gel 18.

The assembly formed by the substrate member 20 and the gel 18 is arranged to completely fill the opening 24 above the lamp house 12. The surface 22 facing the outside of the gel 18 is applied directly against the inner face of the skin 2, which also prevents any presence of air bubbles or dust between the gel 18 and the skin 2.

To define the shape of the pictogram, a mask is provided arranged in the path of the light between the light source 10 and the pictogram area 8, comprising openings allowing light to pass and areas blocking the passage of light. This mask can be an independent member or be printed on one of the members of the trim panel.

The trim panel described above makes it possible to obtain a clear backlit pictogram. Indeed, due to the materials used, gel without bubbles, smooth transparent substrate member, and the arrangement of the trim panel, the light coming from the light source passes through the substrate layer 4 without being deviated or diffused by flaws, such as air bubbles, dust, or an irregularity of the materials.

The method for making the trim panel described above will now be described.

During a first step, a substrate member 20/light-transmitting material 18 assembly is prepared. The gel 18 is poured in the bowl of the substrate member 20. In order to protect the gel 18 during the transport, storage, and/or handling of said assembly, a film 24 is applied on the surface 22 of the transmitting material 18 intended to be in contact with the translucent skin 2. Such a film 24 is for example made of polyethylene. It makes it possible to prevent the deposition of dust on the surface 24 of the gel 18 and to prevent the drying thereof, which could favor the appearance of a crust on the surface 24.

Figure 2:
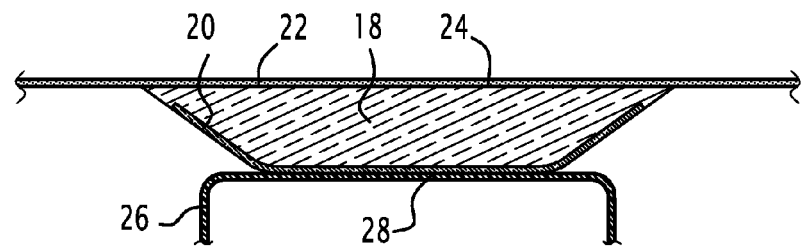
FIG. 2 is a diagrammatic cross-sectional illustration of a substrate member/light-transmitting material assembly used during the method for making the trim panel according to the invention.

A protective member 26 is also arranged against the face 28 of the substrate member 20 intended to be arranged opposite the light source 10, as shown in FIG. 2. Such a protective member 26 is for example a film applied against the face 28. This film makes it possible to protect the face 28, intended to be passed through by the light and prevent any deposition of dust against said face 28. The film also makes it possible to protect the substrate member 20 from the foam, as will be described later.

During a second step, the film 24 is removed from the surface 22 of the gel 18 and the substrate member 20/transmitting material 18 assembly is applied against the skin 2 opposite the pictogram area. The gel 18, when the film 24 is removed, is very adhesive and sticks to the skin. Due to its flexibility, the skin 2 is unrolled on the surface 22, which makes it possible to prevent capturing bubbles between the skin 2 and the surface 22.

The skin 2 and the substrate member 20/transmitting material 18 assembly are then arranged in a molding cavity in order to make the substrate layer 4. To that end, a foam precursor material is for example injected into the molding cavity and the substrate layer 4 forms under the skin 2 around the substrate member 20/transmitting material 18 assembly during the expansion of the foam.

After the expansion of the foam, the opening 14 for receiving the light source is formed opposite the substrate member 20/transmitting material 18 assembly. This opening is for example made by milling of the foam up to the protective film 26 of the face 28 of the substrate member 20. The film protects the substrate member 20 and prevents the foam from adhering against the face 28 of said member. The film 26 is then removed. This film is for example arranged not to adhere to the foam, which makes it possible to facilitate the removal thereof. Moreover, its end portions can be folded, as shown in FIG. 2, in order to further facilitate removal thereof.

Other operations can be provided, such as the arrangement of a rigid substrate insert 30 against the inner face of the substrate layer 4, as shown in FIG. 1.

A trim panel 1 is thus obtained that is free from flaws opposite the pictogram area 8, which makes it possible to obtain a clear backlit pictogram and an optimal display on the skin 2.

Such a trim panel 1 can be used for example to cover the dashboard of a motor vehicle or any other portion of the cab in which the display of information is necessary.

The invention claimed is:

1. A trim panel (1) for a motor vehicle, comprising: at least one pictogram area (8), said area (8) being illuminated by a light source (10) arranged under the trim panel, the trim panel (1) including a translucent skin (2) forming the outer surface (6) of the trim panel and a substrate layer (4) arranged against the skin (2), said substrate layer (4) including an opening (14) arranged at least between the light source (10) and the pictogram area (8), wherein a light-transmitting material (18) is arranged in at least part of said opening (14), said material (18) being arranged in a translucent substrate member (20) arranged in the opening (14) between said material (18) and said light source (10), wherein the light transmitting material (18) is a gel, and wherein the substrate member (20) is hollow such that the gel is poured inside the substrate member.

2. The trim panel according to claim 1, wherein the substrate member (20) is bowl shaped.

3. The trim panel according to claim 2, wherein the substrate member (20) is made from a smooth transparent material.

4. The trim panel according to claim 2, wherein the light-transmitting material (18) is a transparent polyurethane or silicone gel.

5. The trim panel according to claim 2, wherein the light-transmitting material (18) completely fills the opening (14) between the substrate element (20) and the translucent skin (2), said skin (2) being applied directly on said material (18).

6. The trim panel according to claim 1, wherein the substrate member (20) is made from a smooth transparent material.

7. The trim panel according to claim 1, wherein the light-transmitting material (18) is a transparent polyurethane or silicone gel.

8. The trim panel according to claim 1, wherein the light-transmitting material (18) completely fills the opening (14) between the substrate element (20) and the translucent skin (2), said skin (2) being applied directly on said material (18).

9. A method for making a trim panel according to claim 1, comprising the following steps:
- making a substrate member (20)/light-transmitting material (18) assembly by pouring said material (18) in said substrate member (20);
- arranging said assembly against the translucent skin (2) opposite the pictogram area (8); and
- making the substrate layer (4) around said assembly.

10. The production method according to claim 9, wherein the step for making the substrate member (20)/light-transmitting material assembly (18) comprises a step of depositing a film (24) on the surface (22) of the transmitting material (18) intended to be in contact with the translucent skin (2), said film (24) protecting said material (18) and being removed before arranging the assembly against the translucent skin (2).

11. The production method according to claim 7, wherein the step of making the substrate member (20)/transmitting material assembly (18) comprises a step of arranging a protective member (26) against the face (28) of the substrate member (20) intended to be positioned opposite the light source (10).

12. The production method according to claim 11, wherein the step of making the substrate layer (4) comprises a foaming step on the skin (2) around the substrate member (20)/transmitting member assembly (18), the foam then being pierced opposite the assembly up to the protective member (26), the protective member then being removed so as to obtain the trim panel (1).

13. The production method according to claim 9, wherein the step of making the substrate member (20)/transmitting material assembly (18) comprises a step of arranging a protective member (26) against the face (28) of the substrate member (20) intended to be positioned opposite the light source (10).

14. The production method according to claim 13, wherein the step of making the substrate layer (4) comprises a foaming step on the skin (2) around the substrate member (20)/transmitting member assembly (18), the foam then being pierced opposite the assembly up to the protective member (26), the protective member then being removed so as to obtain the trim panel (1).

15. A motor vehicle comprising a trim panel (1) according to claim 1, said panel being applied against at least one portion of a cab of the vehicle.

16. A trim panel (1), for a motor vehicle, with at least one pictogram area (8) to be illuminated by a light source (10), the trim panel (1) comprising:
- an outer surface (6) formed of a translucent skin (2);
- a substrate layer (4) arranged against the translucent skin (2), said substrate layer (4) having an opening (14) therein arranged between the light source (10) and the pictogram area (8);
- a hollow translucent substrate member (20) arranged inside the opening (14) and between the light source (10) and the pictogram area (8), the hollow translucent substrate member (20) forming a barrier that divides the opening (14) into two portions; and
- a light-transmitting material (18) arranged inside a space enclosed by the hollow translucent substrate member (20) between the hollow translucent substrate element (20) and the translucent skin (2),
- wherein the light transmitting material (18) is a gel that is poured inside the hollow translucent substrate member (20).

17. The trim panel according to claim 16, wherein the hollow translucent substrate member (20) is bowl shaped.

18. The trim panel according to claim 17, wherein the light-transmitting material (18) completely fills the opening (14) between the hollow translucent substrate element (20) and the translucent skin (2), said translucent skin (2) in direct contact with said light-transmitting material (18).

19. The trim panel according to claim 16, wherein the light-transmitting material (18) completely fills the opening (14) between the hollow translucent substrate element (20) and the translucent skin (2), said translucent skin (2) in direct contact with said light-transmitting material (18).

* * * * *